(12) United States Patent
Huss, Jr. et al.

(10) Patent No.: US 8,690,504 B2
(45) Date of Patent: Apr. 8, 2014

(54) TORQUE-LIMITED AND REMOVABLE FASTENER FOR ONE-TIME USE

(75) Inventors: John Phillip Huss, Jr., Harrisburg, PA (US); Kevin E. Walker, Hershey, PA (US)

(73) Assignee: Phoenix Contact Development and Manufacturing, Inc., Middletown, PA (US)

(*) Notice: Subject to any disclaimer, the term of this patent is extended or adjusted under 35 U.S.C. 154(b) by 138 days.

(21) Appl. No.: 13/314,655

(22) Filed: Dec. 8, 2011

(65) Prior Publication Data

US 2013/0149065 A1  Jun. 13, 2013

(51) Int. Cl.
*F16B 31/02* (2006.01)

(52) U.S. Cl.
CPC ............ *F16B 31/027* (2013.01); *Y10S 411/911* (2013.01)
USPC ................................ 411/1; 411/911; 411/402

(58) Field of Classification Search
USPC ................. 411/1–3, 5, 8, 9, 911, 402; 81/471
See application file for complete search history.

(56) References Cited

U.S. PATENT DOCUMENTS

| | | | | |
|---|---|---|---|---|
| 1,249,592 | A | * | 12/1917 | Bruhn ............................ 411/394 |
| 1,261,916 | A | * | 4/1918 | Forbes .......................... 411/402 |
| D200,217 | S | | 2/1965 | Curtiss et al. |
| 3,285,119 | A | | 11/1966 | Dean et al. |
| 3,460,428 | A | * | 8/1969 | Charles ............................. 411/2 |
| 4,026,338 | A | * | 5/1977 | Goebel ........................... 81/441 |
| 4,109,691 | A | | 8/1978 | Wilson |
| 4,149,434 | A | | 4/1979 | Wilson |
| 4,258,606 | A | | 3/1981 | Wilson |
| 4,492,500 | A | | 1/1985 | Ewing |
| 5,450,776 | A | * | 9/1995 | Kozak ............................. 81/451 |
| 5,647,712 | A | | 7/1997 | Demirdogen |
| 5,697,743 | A | | 12/1997 | Parker |
| 1,506,500 | A1 | | 8/2004 | Ripamonti et al. |
| 6,802,680 | B1 | | 10/2004 | Rubenstein |
| 7,066,062 | B2 | | 6/2006 | Flesher |
| 7,097,404 | B2 | | 8/2006 | Avganim |
| 7,299,725 | B2 | | 11/2007 | Helstern et al. |
| 2004/0228703 | A1 | | 11/2004 | Such |
| 2007/0048105 | A1 | | 3/2007 | Baker et al. |
| 2007/0253792 | A1 | | 11/2007 | Zahnen et al. |

FOREIGN PATENT DOCUMENTS

| | | |
|---|---|---|
| EP | 0498693 | 8/1992 |
| GB | 2077384 A | 12/1981 |
| WO | 2004012908 | 2/2004 |

* cited by examiner

*Primary Examiner* — Flemming Saether
(74) *Attorney, Agent, or Firm* — Hooker & Habib, P.C.

(57) ABSTRACT

A torque-limited fastener turnable in fastening and loosening directions for one-time use includes a fastener head with a base, a set of lugs extending from the base, and an optional set of ramps extending from the base. The lugs include abutment surfaces facing a fastening tool slot recess that receives a fastening tool. When the fastening tool is turned in the fastening direction it bears against the lug surfaces. The lugs shear off or plastically deform into recesses when the fastening tool applies a limiting fastening torque. The ramps have abutment surfaces facing a loosening tool slot recess that receives a loosening tool. The ramps cam the fastening tool over the ramp abutment surfaces if the fastening tool is in the fastening tool recess and is turned in the fastening direction after the lugs have sheared off or have plastically deformed in response to application of the limiting torque.

27 Claims, 6 Drawing Sheets

TORQUE-LIMITED AND REMOVABLE FASTENER FOR ONE-TIME USE

FIELD OF THE DISCLOSURE

Disclosed are fasteners that turn or rotate about an axis of rotation for fastening and loosening, and more specifically, a torque-limited fastener that can both be fastened and loosened but resists being re-fastened after application of the limiting torque.

BACKGROUND OF THE DISCLOSURE

Screw-type fasteners are available that limit the torque that can be applied to the fastener by a fastening tool such as a screwdriver or socket drive. Excessive torque may damage the fastener itself or may damage the objects fastened together by the fastener. If the fastener itself is damaged, it may be difficult to unloosen and remove later.

In one known type of torque-limited fastener, the fastener has component parts that shear off and separate from the remainder of the fastener when a drive tool applies a limiting torque. The component parts are also used for loosening the fastener, so it may be difficult or impossible to remove the fastener after the component parts are sheared off.

Other known types of torque-limited fasteners incorporate separate, multi-part mechanical components that slip relative to one another when a drive tool applies a limiting torque to the fastener. Although these fasteners can be later loosened after fastening, the fasteners are expensive and the component assemblies prone to failure such that the applied torque exceeds the desired limiting torque.

Thus there is a need for a reliable torque-limited fastener that limits the torque that can be applied to the fastener and yet can be loosened and removed after fastening. The fastener is preferably an integral-one piece member so that costs associated with a multi-part assembly are eliminated. In possible embodiments, the fastener should not include component parts that shear off and separate from the remainder of the fastener for use in environments where such loose parts should be avoided.

BRIEF SUMMARY OF THE DISCLOSURE

Disclosed is a torque-limited fastener that limits the torque that can be applied to the fastener and yet can be loosened and removed after fastening. In preferred embodiments the fastener is an integral, one-piece member that can be fastened using a conventional drive tool such as a screwdriver or socket drive and loosened after tightening with a conventional drive tool such as a screwdriver or socket drive. In further preferred embodiments the fastener has component parts that plastically deform but do not separate from the fastener when a limiting torque is applied to the fastener.

An embodiment of a removable torque-limited fastener includes a fastening head and a fastening body integral with the fastening head. The fastening head is configured to be turned in a fastening direction about an axis of rotation and turned in an opposite loosening direction about the axis.

The fastening head includes a base, a set of lugs extending from the base, and preferably a set of ramps extending from the base. The set of lugs includes one or more lugs, and the set of ramps includes one or more ramps.

If the set of lugs includes more than one lug, the lugs are circumferentially spaced from one another. Each lug includes a fastening abutment surface on one side of the lug extending upwardly from the base and facing the loosening direction.

If the set of ramps includes more than one ramp, the ramps are circumferentially spaced from one another. Each ramp includes a loosening abutment surface and an inclined camming surface. The loosening abutment surface extends axially upwardly from the base and faces the fastening direction. The camming surface extends in the loosening direction away from the loosening abutment surface, the cam surface sloped axially towards the base in the loosening direction.

The one or more loosening abutment surfaces face a loosening tool recess defined at least in part by the set of ramps, the loosening tool recess to receive a loosening tool that has a set of drive surfaces that correspond to the set of loosening abutment surfaces. When the loosening tool is inserted axially into the loosening tool recess, each loosening abutment surface faces a respective drive surface of the loosening tool and receives torque urging the fastener to turn in the loosening direction from the drive surface when the loosening tool is turned in the loosening direction.

The one or more fastening abutment surfaces face a fastening tool recess defined at least in part by the set of lugs, the fastening tool recess to receive a fastening tool that has drive surfaces that correspond to the set of fastening abutment surfaces. When the fastening tool is inserted axially into the fastening tool recess, each fastening abutment surface faces a respective drive surface of the fastening tool and receives torque urging the fastener to turn in the fastening direction from the drive surface when the fastening tool is turned in the fastening direction.

The set of lugs are configured to plastically deform or shear off such that the set of fastening abutment surfaces no longer engage the drive surfaces of the fastening tool upon a limiting torque being applied to the fastener head by the fastening tool. This limits the torque transferred from the fastening tool to the fastener head to the limiting torque.

The set of ramp cam surfaces are configured to cam a tool inserted into the tool recess defined by the ramps axially away from the base when the tool is rotated in the fastening direction when inserted into the tool recess after the lugs have sheared off or have deformed. The tool rides on the cam surfaces and over the loosening abutment surfaces so that the drive surfaces of the tool cannot bear against the loosening abutment surfaces when rotated in the fastening direction.

In embodiments in which the set of lugs plastically deform when a limiting torque is applied by the fastening tool, there is a recess formed in the base adjacent each lug and extending away from the lug. The plastically deformed lug is received in the recess adjacent the lug.

In possible embodiments, the sets of ramps and lugs can be arranged so that all the abutment surfaces lie on a common circle extending through each abutment surface. In such embodiments, the same drive tool can be used for fastening as well as loosening the fastener. For example, a flat-bladed screwdriver can both fasten and loosen the fastener.

In other embodiments, one of the sets of ramps and lugs can extend from an outer, annular portion of the base that surrounds an inner portion of the base. The other of the sets of ramps and lugs can extend from the inner portion. The outer set of abutment surfaces defines a first tool recess and the inner set of abutment surfaces defines a second tool recess.

In yet other embodiments, the inner portion can be a concave portion that is configured to receive a body of a drive tool for loosening or fastening.

In yet other possible embodiments, the outer annual portion can be a tubular portion with a constant inner diameter or with a non-constant diameter that changes as the outer annual portion extends away from the inner portion of the base. In one possible embodiment the outer annual portion is configured to receive the body of a first, larger drive tool and the inner portion is configured to receive the body of a second, smaller drive tool.

In additional possible embodiments, the pair of tool recesses are configured to be incompatible with one another, that is, a fastening tool cannot be received in the loosening tool recess and the loosening tool cannot be received in the fastening tool recess.

In further possible embodiments, the fastener includes an additional fastening abutment surface that remains in place after the limiting torque is applied during fastening. When the set of lugs deform or shear off, the fastening tool can no longer apply fastening torque to the fastener with just the additional fastener abutment surface remaining. In such embodiments a ramp is preferably located across from the fastening tool recess to cam the fastening tool over the additional abutment surface if the fastening tool is turned in the fastening direction after the set of lugs have deformed or sheared off. The additional fastening abutment surface may be located on the loosening direction end of an additional circumferential ramp similar to a ramp of the set of ramps but extending in the opposite direction.

In yet further additional embodiments, the fastener includes an additional loosening abutment surface that is not located on the circumferential end of a ramp.

In the most preferred embodiments, the fastener is an integral, homogeneous, one-piece member preferably formed from metal or plastic. The fastening body can have an external screw thread or can have other fastening structure, such as bayonet pins, that are known in the fastener art. The fastener head can also be attached to a fastener body that is formed as a threaded lid or threaded container top.

The fastener has a number of advantages. It enables a torque-limiting fastener that can be easily loosened and removed even if the lugs are plastically deformed or sheared off. The fastener can be manufactured as a one-piece metal member for strength and reliability.

A further advantage is that if the fastener is loosened and removed, the fastener cannot be reinstalled and fastened. If an assembly that is originally fastened using a fastener of the type disclosed herein is later found to have a replacement conventional standard fastener, such replacement may be evidence of unauthorized access to or tampering of the assembly.

Other objects and features will become apparent as the description proceeds, especially when taken in conjunction with the accompanying drawing sheets illustrating multiple embodiments.

DESCRIPTION OF THE PREFERRED EMBODIMENTS

Figure 1:
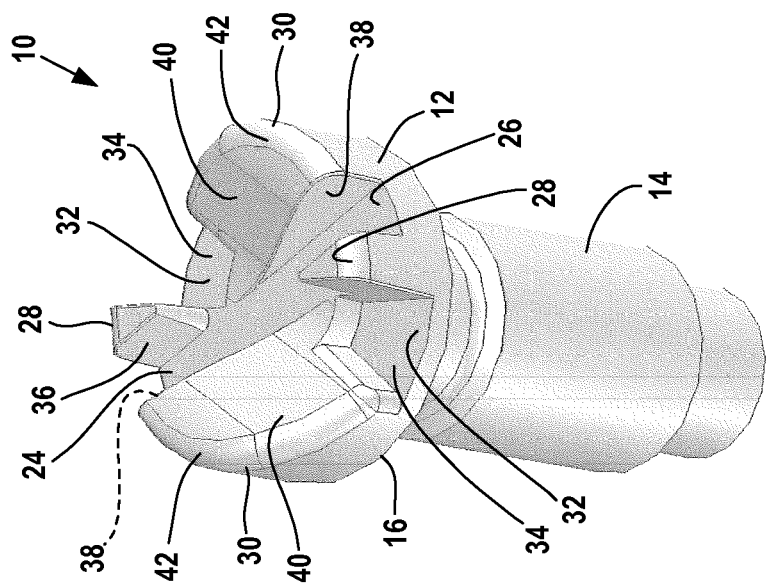
FIG. 1 is a perspective view of a first embodiment fastener.
Figure 2:
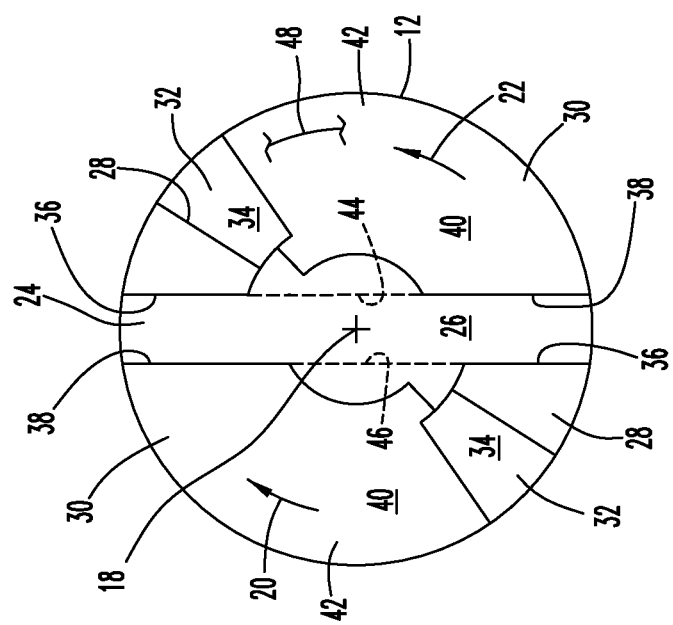
FIG. 2 is a top view of the fastener shown in FIG. 1.

FIGS. 1 and 2 illustrate a first embodiment removable, torque-limited fastener 10. The fastener 10 includes a fastening head 12 and an integral fastening body 14 extending from a lower side 16 of the fastening head 12. The fastener 12 extends axially along an axis of rotation 18, the axis perpendicular to the drawing sheet as viewed in FIG. 2. As viewed in the figure, the fastener 10 is configured to turn in a clockwise fastening direction 20 and turned in a counterclockwise loosening direction 22. The illustrated fastener 10 is a homogenous one-piece metal member (which may be steel, brass, or the like). In alternative embodiments the fastener 10 may be a non-metallic member made of plastic or the like.

The fastening body 14 is a conventional externally threaded body. Alternative embodiments of the fastening body 14 can have some other fastening structure, such as pins for a bayonet mounting, that requires rotation in opposite directions for fastening and loosening.

The fastening head 12 has an upper side 24 defining a flat base 26. A set of drive protuberances or lugs 28 and a set of circumferential ramps 30 extend upwardly from the base 26 and are circumferentially spaced apart from one another. The lugs 28 and ramps 30 alternate in the circumferential direction; the illustrated embodiment has two lugs 28 and two ramps 30. Extending from one side of each lug 28 is a recess 32 formed in the base 26. Each recess 32 has a floor 34 extending in the tightening direction away from the lug 28 and towards an adjacent ramp 30.

Each lug 28 has a flat abutment surface 36 that extends axially substantially perpendicular to the base 26 and faces the loosening direction.

Each ramp 30 has a flat abutment surface 38 that extends axially substantially perpendicular to the base 26 and faces the fastening direction. Extending in the loosening direction from the top of the abutment surface 38 and towards the base 26 is a ramp body 40. The ramp body 40 includes an axially-facing, inclined cam surface 42 that extends axially towards the base 26 in the loosening direction (and extends axially away from the base 26 and towards the upper end of the abutment surface 38 in the fastening direction).

The lug abutment surfaces 36 represent fastening abutment surfaces that are configured to be engaged by a fastening tool having drive surfaces that urges the fastener head 12 in the fastening direction. The fastening abutment surfaces 36 are arranged to define a fastening tool recess 44 over the base 26 that receives the drive surfaces when the fastening drive tool is received axially into the recess. In the illustrated embodiment the two fastening abutment surfaces 36 define a rectangular-shaped recess 44 configured to receive the blade of a flat-bladed screwdriver, with the abutment surfaces 36 on opposite ends and on opposite sides of the rectangular fastening tool recess 44.

The ramp abutment surfaces 38 represent loosening abutment surfaces that are configured to be engaged by the drive surfaces of a loosening tool that urges the fastener head 12 in the loosening direction. The loosening abutment surfaces 38 are arranged to define a loosening tool recess 46 over the base 26 that receives the drive surfaces when the loosening drive tool is received axially in the recess. In the illustrated embodiment the two loosening abutment surfaces 38 define a rectangular-shaped recess 46 to receive the blade of a flat-bladed screwdriver.

Furthermore, the tool recesses 44, 46 defined by the sets of abutment surfaces 36, 38 are concurrent with one another— that is, the tool recesses 44, 46 define the same identical tool recess both for fastening and loosening the fastener 10.

Because the abutment surfaces 36, 38 of the fastener head 10 are arranged on a common circle 48 that passes through each surface 36, 38, the same flat-bladed screwdriver may be used for fastening as well as for later loosening of the fastener 10. The screwdriver is moved axially along the centerline 18 so that the screwdriver blade is received in the tool recess 44, with the screwdriver blade facing the fastening abutment surfaces 36. Turning the screwdriver in the fastening direction presses the screwdriver blade against the fastening abutment surfaces 36 and transmits torque to the surfaces 36, thereby turning the fastener 10 in the fastening direction in a conventional manner.

When the fastener 10 tightens and the torque applied by the screwdriver exceeds a predetermined limiting amount or threshold, the lugs 28 plastically deform in reaction to the applied torque. The lugs 28 deform and move into their associated recesses 32 and are no longer able to effectively transmit torque from the screwdriver blade to the fastening head 12, thereby limiting the torque that can be applied to the fastener 10.

Figure 3:
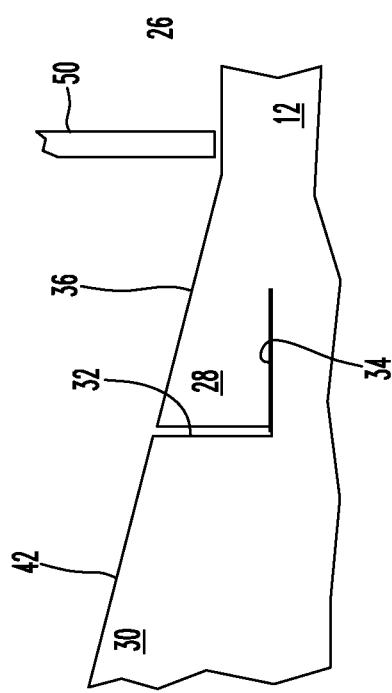
FIG. 3 is a partial side view of a portion of the fastener shown in FIG. 1 after a limiting fastening torque has been applied to the fastener head from a fastening tool.

FIG. 3 illustrates a portion of the fastener head 12 after a plastically deformed lug 28 is received in a recess 32 adjacent a ramp 30. The fastening abutment surface 36 no longer engages the screwdriver blade 50 even if the screwdriver blade continues to turn in the fastening direction. In the illustrated embodiment the cam surface 42 of the ramp 30 cooperates with the abutment surface 36 of the deformed lug 28 to be at or higher than the top of the surface 32. In alternative embodiments the recess floor 34 can be inclined with respect to the base 26 to assist in the deformed lug surface 36 being oriented at or higher than the top of the surface 32.

Continued rotation of the screwdriver in the fastening direction causes the screwdriver blade 50 to move over the lug abutment surface 36, onto the cam surface 42 and over the ramp abutment surface 38. In this way the cam surfaces 36 and 42 cams the screwdriver blade axially away from the base 26 so that the screwdriver blade cannot bear against the loosening abutment surfaces 38 when turning in the fastening direction after plastic deformation of the lugs 28.

Figure 4:
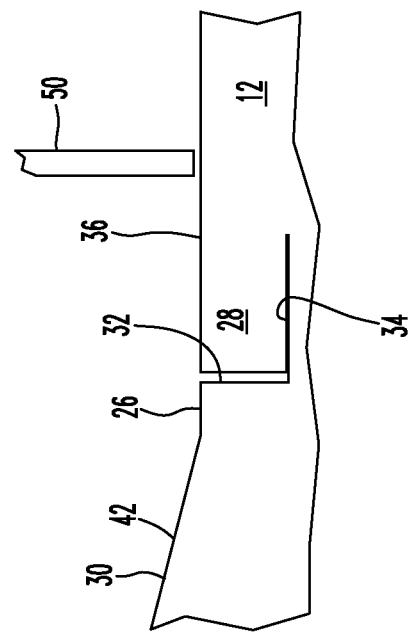
FIG. 4 is a partial side view similar to FIG. 3 of a second embodiment fastener.

FIG. 4 is similar to FIG. 3 but illustrates the deformation of the lug 28 in an alternative embodiment of the fastener head 12. In this embodiment the recess 32 ends in the fastening direction at or before the start of the adjacent ramp 30. In this embodiment the abutment surface 36 of the deformed lug 28 is essentially flush with the surrounding base 26. The cam surface 42 of the ramp 30 starts its upward slope in the fastening direction flush with the base 26.

In another alternative embodiment of the fastener 10 in which the lugs 28 shear off when a limiting torque is applied, the recesses 32 are eliminated. The ramp cam surfaces 42 would begin sloping upwardly in the fastening direction flush from the base 26 as shown in FIG. 4.

Figure 5:
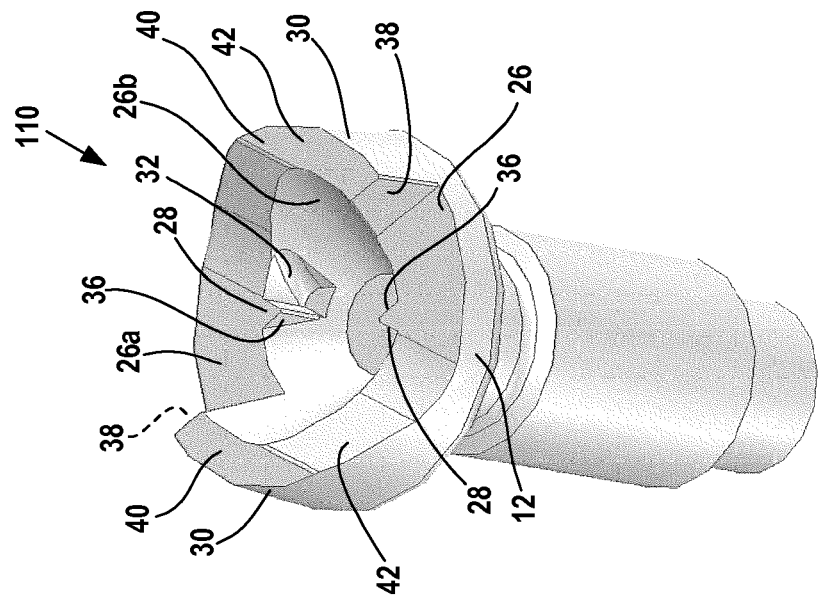
FIG. 5 is a perspective view of a third embodiment fastener.
Figure 6:
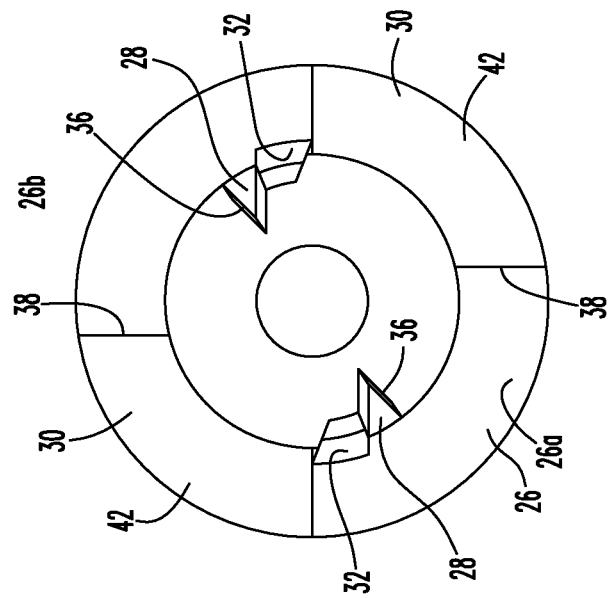
FIG. 6 is a top view of the fastener shown in FIG. 5.

The fastener 10 can be fastened and loosened using the same flat-bladed screwdriver. FIGS. 5 and 6 illustrate an alternative embodiment fastener 110 that is fastened using a Phillips-head screwdriver and is loosened using a flat-bladed screwdriver. Corresponding component parts of the fastener 110 are numbered with the same reference numbers used in describing the fastener 10.

The fastener head base 26 is made up of an outer, flat annular portion 26a that surrounds a concave interior portion 26b. Two ramps 30 are spaced circumferentially around the annular portion 26a. Each ramp 30 has an axially inclined cam surface 42 that extends ninety degrees in the fastening direction from the base portion 26a to the loosening abutment surface 38 facing the fastening direction. The pair of abutment surfaces 38 define a loosening tool recess identical to the loosening tool recess 46 over the base 26 previously described. In this embodiment the loosening tool recess extends over the concave base portion 26b.

The concave base portion 26b is conical-shaped with the inside diameter of the base portion 26b decreasing in the direction away from the flat base portion 26a. The base portion 26b is truncated before reaching the tip of the cone defined by the base portion 26b.

A pair of lugs 28 extend away from the base portion 26b and extend radially into the interior of the concave base portion 26b. Each lug 28 has a fastening tool abutment surface 36 on the side of the lug 28 facing the loosening direction. A recess 32 formed in the conical base portion 26b extends from the opposite side of the lug 28 in the fastening direction.

The concave base portion 26b is sized and configured to receive the head of a Phillips-head screwdriver. The fastening tool abutment surfaces 36 define a fastening tool recess that receives two of the blades of the Phillips-head screwdriver when the head of the screwdriver is inserted into the interior of the base portion 26a.

A Phillips-head screwdriver is inserted into the base portion 26b to fasten the fastener 110. The blades of the screwdriver are received in the tool recess defined by the lug fastening abutment surfaces 36 and face the lug surfaces 36. The screwdriver is then rotated in the fastening direction with the screwdriver blades bearing against the fastening surfaces 36 and applying torque fastening the fastener 110 in a conventional manner.

When the fastener 110 tightens and the torque applied by the screwdriver exceeds a predetermined limiting amount or threshold, the lugs 28 plastically deform into the lug recesses 32 as previously described, thereby limiting the transmission of torque to the fastener head 12. When the lugs 28 deform into the recesses 32 the head of the Phillips-head screwdriver is located in an essentially smooth-walled conical portion 26b that has no protruding surfaces to engage the screwdriver blades and transmit torque from the screwdriver to the fastener head 12.

The blade of a flat-headed screwdriver moves axially to receive the blade of the screwdriver into the loosening tool recess defined by the loosening abutment surfaces 38. The screwdriver blade faces the two abutment surfaces 38. The blade is too large to fit in the conical depression 26b and so the blade extends over the base portion 26b. The screwdriver is turned in the loosening direction and the blade of the screwdriver bears against the loosening abutment surfaces 38 to transmit loosening torque to the fastener head 12 as previously described.

If the flat-bladed screwdriver is turned in the fastening direction when in the loosening tool recess the blade rides on the ramp cam surfaces 42 which cam the screwdriver blade axially away from the base 24, out of the loosening tool recess, and over the abutment surfaces 38 so that fastening torque is not transmitted from the flat-bladed screwdriver to the fastener head 12.

In alternative embodiments of the fastener 110, the concave base portion 26b can be shaped to fit other types of screw fastening tools and the lugs 28 configured to receive the bearing surfaces of such tools. For example, the base portion 26b could have a constant inner diameter. The number and configuration of the lugs 28 could be designed to engage the bearing surfaces of a 4-sided square or 6-sided hex screw drive, or a 5-sided or 6-sided star driver.

In yet other alternative embodiments of the fastener 110, the ramps 30 and their associated loosening abutment surfaces 38 extend from the concave base portion 26b to receive a loosening tool inserted into the base portion 26b and the lugs 28 extend from the annular portion 26a.

In yet further alternative embodiments of the fastener 110, the annular base portion 26a can define a conical or other tubular cavity extending axially away from the inner concave base portion 26b to receive a tool body. For example, the concave base portion 26a can have a conical interior surface configured to receive a relatively larger Phillips-head screwdriver for fastening or loosening, and the inner base portion 26b can be configured to receive a relatively smaller Phillips-head screwdriver for loosening or fastening. Or the tubular base portion 26a can be a uniform diameter tubular portion configured to receive the body of a square or hex drive, with the lugs or ramps extending from the inner surface of the base portion 26a.

Figure 7:
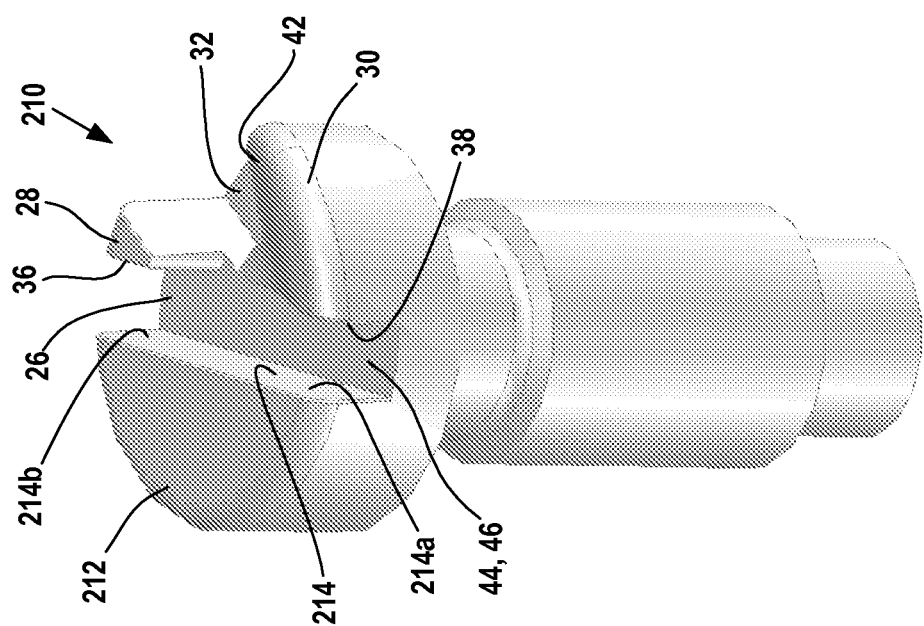
FIG. 7 is a perspective view of a fourth embodiment fastener.
Figure 8:
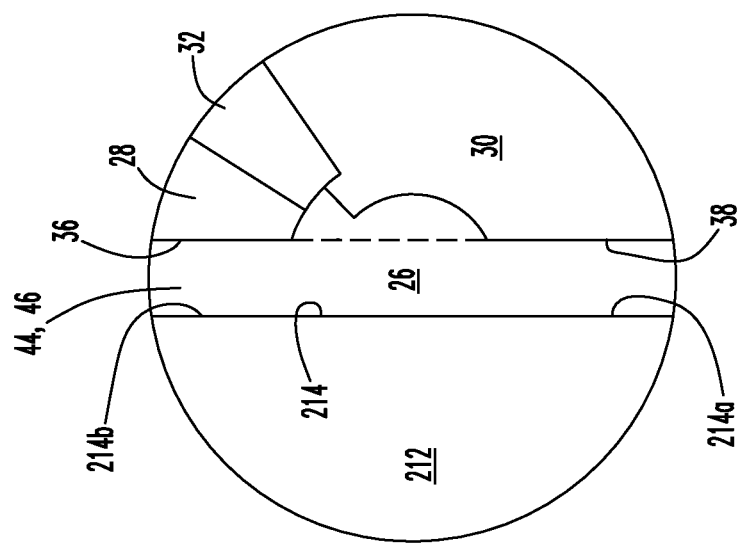
FIG. 8 is a top view of the fastener shown in FIG. 7.

FIGS. 7 and 8 illustrate an alternative embodiment fastener 210 that is similar to the fastener 10 in being fastened and loosened by a flat-bladed screwdriver. Corresponding component parts of the fastener 210 are numbered with the same reference numbers used in describing the fastener 10.

The fastener 210 includes one lug 28, one ramp 30, and one recess 32 arranged on one side of a fastening tool recess 44. The lug 28, the ramp 30, and the recess 32 are identical to the corresponding features on one side of the tool recess 44 of the fastener 10. The tool recess 44 is identical to the corresponding tool recess 44 of the fastener 10. On the other side of the slot recess 44 is a generally semicircular shaped wall 212 that extends a uniform height from the flat base 26 and has a wall surface 214 facing the slot recess 44.

The lug fastening abutment surface 36 and the wall 214 cooperate to define the loosening tool recess 46 that is concurrent with the fastening tool recess 44. The wall surface 214 includes radially opposite fastening abutment surface portion 214a and loosening abutment surface portion 214b.

When the screwdriver blade is moved axially into the tool recess 44 for fastening the fastener 210, the blade faces both the fastening abutment surface 36 on one side of the blade and the fastening abutment surface 214a on the other side of the blade.

When the screwdriver turns in the fastening direction, fastening torque transmitted from the blade through the surfaces 36 and 214a to the fastener head 12 turns the fastener 210 in the fastening direction. When the limiting torque is reached, the lug 28 plastically deforms into the recess 32 as previously described. Continued rotation of the screwdriver causes the blade to ride on the ramp cam surface 42 and cams the screwdriver axially away from the base 26 and moves the screwdriver blade out of the fastening tool recess 44 so that no fastening torque can be applied to the fastener 210.

When the screwdriver blade is moved into the tool recess 46 and turns in the loosening direction, loosening torque transmitted from the blade through the loosening abutment surfaces 38 and 214b turns the fastener 210 in the loosening direction.

The illustrated embodiments are intended for one-time fastening and can also be loosened. In alternative embodiments the fastener can be intended for permanent installation after being fastened by eliminating the ramps 30 so that there are no loosening abutment surfaces. For example, the set of ramps 30 of the fastener 10 are eliminated so that there are no abutment surfaces available after the set of lugs 28 plastically deform.

Figure 9:
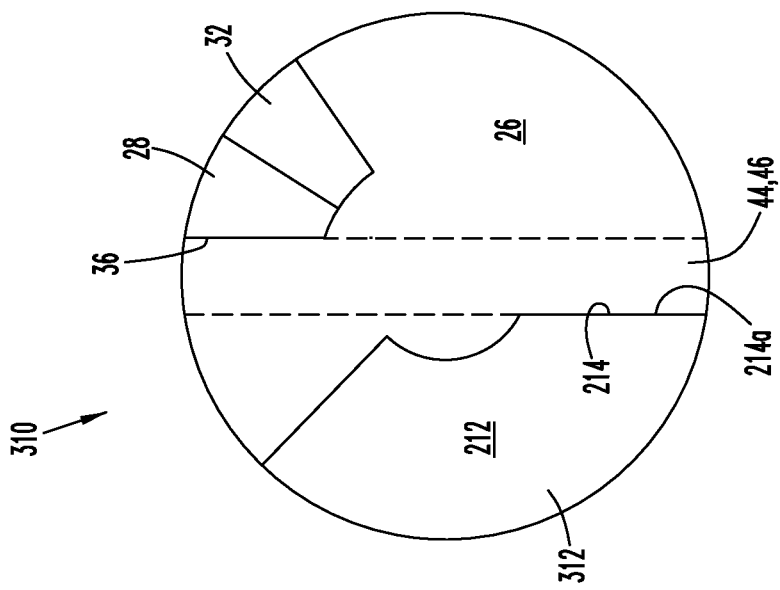
FIG. 9 is a top view of a fifth embodiment fastener that is intended for permanent installation after fastening.

FIG. 9 illustrates an alternative embodiment fastener 310 intended and modified from the fastener 210 for permanent installation. Corresponding component parts of the fastener 310 are numbered with the same reference numbers used in describing the fastener 210.

The fastener 310 is similar to the fastener 210 but with the ramp 30 eliminated. The wall 212 is configured with its wall surface 214 on the radially opposite side of the fastener head from the lug 28 to provide only a fastening abutment surface 214a.

In the illustrated embodiment of the fastener 310 the wall 212 is additionally formed as a ramp similar to the ramp 30 of the fastener 210 but extending in the fastening direction from the fastening abutment surface 214a. The inclined cam surface 312 of the wall/ramp 212 extends downwardly towards the base 26 in the fastening direction and axially cams a drive tool turning in the loosening direction over the fastening abutment surface 214a.

A flat-bladed screwdriver inserted into the fastening tool recess 44 defined by the surfaces 36, 214a can fasten the fastener 310 but after the lug 28 plastically deforms into the recess 32, the screwdriver cannot be used to further tighten or loosen the fastener 310.

Figure 10:
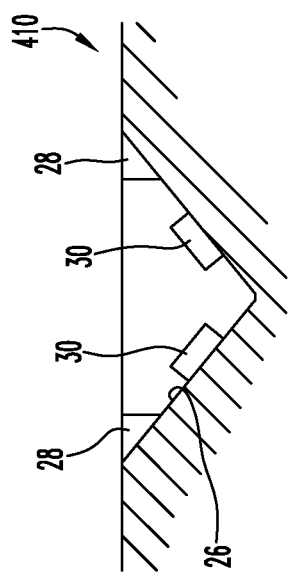
FIGS. 10-12 are vertical sectional views of respectively a sixth embodiment, seventh embodiment, and eighth embodiment fastener.
Figure 11:
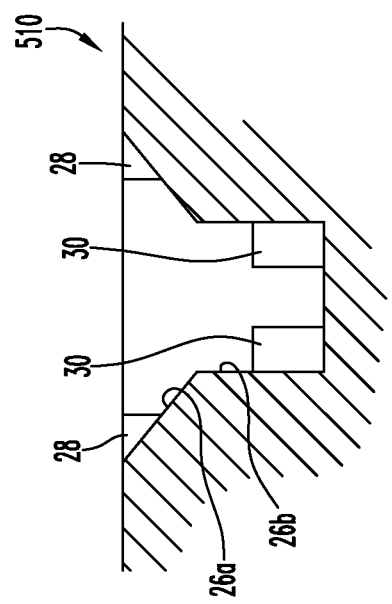
Figure 12:
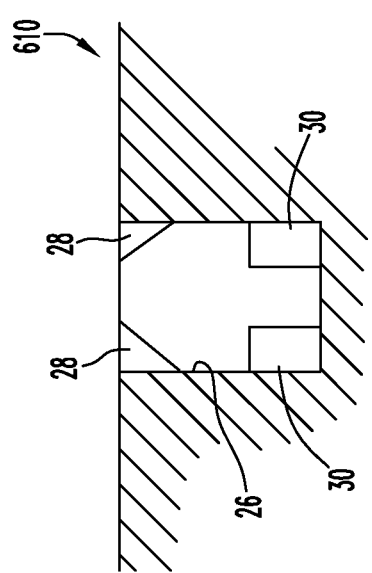

In yet other possible alternative embodiments, the sets of lugs 28 and ramps 30 may both be located within a concave portion or blind bore extending along the fastener's axis of rotation. FIG. 10 illustrates schematically a fastener 410 in which the set of lugs 28 and the set of ramps 30 each extend from the surface of a conical bore for fastening and loosening of the fastener by a Phillips head screwdriver. The set of lugs 28 and the set of ramps 30 are both radially and axially spaced from one another. In the illustrated embodiment the lugs 28 are axially spaced above the ramps 30 but in alternative embodiments the axial positions of the lugs 28 and ramps 30 can be reversed. FIG. 11 illustrates schematically a fastener 510 in which the bore 26 includes an conical portion 26a and a circular cylinder portion 26b closed at the bottom. The set of lugs 28 are configured to receive a Phillips-head screwdriver and the set of ramps 30 are configured to receive a socket drive. FIG. 12 illustrates schematically a fastener 610 in which the bore 26 is a circular cylinder, with the set of lugs 28 and the set of ramps 30 extending into the bore 26. The lugs 28 are spaced radially from the axis of rotation essentially the same distance as the ramps 30, but the lugs 328 are spaced axially above the set of ramps 30. The lugs 28 must deformed before a socket drive can engage the loosening abutment surfaces.

While embodiments have been illustrated and described herein, it is understood that this is capable of modification, and therefore the scope of the disclosure is not limited to the precise details set forth but also includes such changes and alterations as fall within the purview of the following claims.

What we claim as our invention is:

1. A removable torque-limited fastener configured to turn about an axis in a fastening direction for fastening and turned about the axis in an opposite loosening direction for loosening, the fastener comprising:
 a fastening head and a fastening body integral with the fastening head, the fastening head configured to be turned in a fastening direction about an axis of rotation and turned in an opposite loosening direction about the axis;

the fastening head comprising a base, a set of lugs, a set of first recesses, and a set of ramps, the set of lugs comprising one or more lugs and the set of ramps comprising one or more ramps;

if the set of lugs comprises more than one lug, the lugs are circumferentially spaced apart from one another about the axis, if the set of ramps comprises more than one ramp, the ramps are circumferentially spaced apart from one another about the axis;

each lug comprising a fastening abutment surface extending axially away from the base and facing the loosening direction;

each first recess formed in the base and associated with a respective lug of the set of lugs, each first recess extending away from the lug associated with said first recess;

each ramp comprising a loosening abutment surface extending axially away from the base, the loosening abutment surface facing the fastening direction, and an inclined cam surface extending in the loosening direction away from the loosening abutment surface, the cam surface inclined axially towards the base in the loosening direction;

the set of loosening abutment surfaces facing a second recess at least partially defined by the set of ramps, the second recess to receive a loosening tool that has a set of drive surfaces that bear against the set of loosening abutment surfaces when the loosening tool is inserted into the second recess and applying torque urging the fastener to turn in the loosening direction;

the set of fastening abutment surfaces facing a third recess at least partially defined by the set of lugs, the third recess to receive a fastening tool that has a set of drive surfaces that bear against the set of fastening abutment surfaces when the fastening tool is inserted into the third recess and applying torque urging the fastener to turn in the fastening direction; and the set of lugs configured to plastically deform into the set of first recesses upon the limiting torque being applied by the fastening tool so that the fastening abutment surfaces of the lugs no longer engage the drive surfaces of the fastening tool upon a limiting torque being applied to the fastener head by the fastening tool so that the torque transferred from the fastening tool to the fastener head is limited to the limiting torque.

2. The fastener of claim 1 wherein the set of lugs consists of one and only one lug, the set of first recesses consists of one and only one first recess, and the set of ramps consists of one and only one ramp.

3. The fastener of claim 1 wherein each first recess of the set of first recesses is located circumferentially between its associated lug and an adjacent ramp of the set of ramps.

4. The fastener of claim 3 wherein when each lug is deformed into its associated first recess, the fastening abutment surface of the lug cooperates with the cam surface of the adjacent ramp to define an essentially continuous inclined camming surface extending along the lug and along the ramp.

5. The fastener of claim 1 wherein the base comprises a generally flat surface, the set of lugs and the set of ramps extending from the flat surface.

6. The fastener of claim 1 wherein the set of lug abutment surfaces and the set of ramp abutment surfaces together define a circle passing through each said abutment surface, each ramp extending circumferentially along the circle.

7. The fastener of claim 6 wherein the base is flat; the set of lugs consists of a first lug and a second lug and the set of ramps consists of a first ramp and a second ramp; the abutment surfaces of the ramps and the abutment surfaces of the lugs are arranged such that the second recess and the third recess are concurrent with one another, the second and third recesses extending along a longitudinal axis, the two fastening abutment surfaces on opposite ends and on opposite sides of the second and third recesses and the two loosening abutment surfaces on opposite ends and opposite sides of the second and third recesses whereby a flat-bladed screwdriver can be received in the second and third recesses for both fastening and loosening of the fastener.

8. The fastener of claim 1 wherein at least a portion of the base comprises a concave portion, and at least one of the following (a) and (b) extends from the concave portion of the base: (a) the set of ramps and (b) the set of lugs.

9. The fastener of claim 8 wherein the concave portion of the base is a conical portion.

10. The fastener of claim 9 wherein both the set of ramps and the set of lugs extend from the conical portion of the base.

11. The fastener of claim 8 wherein the base comprises a flat annular portion surrounding the concave portion of the base, and one of the following (a) and (b) extends from the annular portion of the base and the other of the following (a) and (b) extends from the concave portion of the base: (a) the set of ramps and (b) the set of lugs.

12. The fastener of claim 11 wherein the set of ramps extend from the annular portion of the base, and the set of ramp abutment surfaces define the second recess as being capable of receiving a Phillips-head screwdriver for loosening the fastener.

13. The fastener of claim 11 wherein the set of first recesses are formed in the annular portion of the base.

14. The fastener of claim 1 wherein one of the following (a) and (b) extends from an outer annular portion of the base and the other of the following (a) and (b) extends from an inner annular portion of the base, the outer annular portion surrounding the inner annular portion: (a) the set of ramps and (b) the set of lugs.

15. The fastener of claim 1 wherein the set of lug abutment surfaces and the set of ramp abutment surfaces together define a common circle passing though each abutment surface.

16. The fastener of claim 1 wherein the set of ramps is axially spaced from the set of lugs.

17. The fastener of claim 16 wherein the set of lugs and the set of ramps are located in a common bore extending into the base.

18. The fastener of claim 1 wherein the ramp cam surfaces are configured such that the fastening tool rides on the cam surfaces and is axially displaced over the set of loosening abutment surfaces so that the drive surfaces of the fastening tool cannot bear against the set of loosening abutment surfaces when the fastening tool is rotated in the fastening direction after the set of lugs have deformed.

19. A torque-limited fastener comprising:
a fastening head and a fastening body integral with the fastening head, the fastening head configured to be turned in a fastening direction about an axis of rotation;
the fastening head comprising a base, a set of protuberances extending from the base, and a set of recesses formed in the base, the set of protuberances comprising one or more protuberances, the set of recesses comprising one or more recesses, if the set of protuberances including more than one protuberance the protuberances being circumferentially spaced from one another about the axis;

each protuberance comprising an abutment surface extending upwardly from the base and facing the loosening direction;

each recess of the set of recesses associated with a respective protuberance and extending away from the abutment surface of said associated protuberance;

the set of abutment surfaces facing a tool recess above the base, the tool recess to receive a fastening tool that has a set of drive surfaces that bear against the set of abutment surfaces when the fastening tool is inserted into the tool recess and applying torque urging the fastener to turn in the fastening direction; and each protuberance of the set of protuberances being configured to plastically deform and deform into the recess associated with said protuberance such that the fastening abutment surface of the protuberance can no longer engage a drive surface of the fastening tool upon a limiting torque being applied to the fastener head by the fastening tool.

20. The fastener of claim 19 in which each recess of the set of recesses extends in the fastening direction away from its associated protuberance.

21. The fastener of claim 19 in which the base is flat and the set of recesses extend into the base.

22. The fastener of claim 19 in which the base comprises a concave portion and the set of recesses are formed in the concave portion of the base.

23. The fastener of claim 22 wherein the concave portion of the base is a conical portion.

24. The fastener of claim 22 wherein the concave portion of the base is a blind bore extending axially to a bottom of the bore.

25. The fastener of claim 19 in which the abutment surface of each protuberance is inclined from the perpendicular with respect to the axis of rotation after being plastically deformed and received into the recess associated with the protuberance.

26. The fastener of claim 19 wherein the axis of rotation defines a loosening direction opposite the fastening direction;

the set of protuberances consists of one and only one protuberance and the fastener includes a second abutment surface extending axially from the base and facing the loosening direction, the second abutment surface configured to not deform out of the path of the fastening tool upon a limiting torque being applied to the fastener head by the fastening tool.

27. The fastener of claim 26 comprising a sloped surface extending in the fastening direction away from the second abutment surface and towards the base.

* * * * *